(12) United States Patent
Nakagawa

(10) Patent No.: US 7,701,822 B2
(45) Date of Patent: Apr. 20, 2010

(54) RECORDING METHOD, INFORMATION RECORDING DEVICE, INFORMATION REPRODUCING DEVICE, PROGRAM, RECORDING MEDIUM, AND COMPUTER PROGRAM PRODUCT

(75) Inventor: Masaaki Nakagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 611 days.

(21) Appl. No.: 11/596,799

(22) PCT Filed: Apr. 25, 2005

(86) PCT No.: PCT/JP2005/007793

§ 371 (c)(1),
(2), (4) Date: Jan. 24, 2007

(87) PCT Pub. No.: WO2005/112029

PCT Pub. Date: Nov. 24, 2005

(65) Prior Publication Data

US 2007/0247991 A1 Oct. 25, 2007

(30) Foreign Application Priority Data

May 17, 2004 (JP) .............................. 2004-145738

(51) Int. Cl.
G11B 27/36 (2006.01)

(52) U.S. Cl. ................................ 369/53.16; 369/47.14

(58) Field of Classification Search ... 369/53.15–53.17, 369/47.14, 53.31
See application file for complete search history.

(56) References Cited

U.S. PATENT DOCUMENTS

| 5,841,748 | A  | * | 11/1998 | Yamamuro ............... 369/47.14 |
| 6,181,870 | B1 | * | 1/2001  | Okada et al. ................. 386/126 |
| 6,272,085 | B1 |   | 8/2001  | Maeda |
| 6,282,365 | B1 | * | 8/2001  | Gotoh et al. ................. 386/126 |
| 6,341,109 | B1 |   | 1/2002  | Kayanuma |
| 6,384,997 | B1 | * | 5/2002  | Wu et al. ....................... 360/46 |
| 2003/0202443 | A1 | | 10/2003 | Nakagawa et al. |

FOREIGN PATENT DOCUMENTS

| JP | 2000-228070 | 8/2000 |
| JP | 2001-229622 | 8/2001 |
| JP | 2002-298512 | 10/2002 |
| JP | 2003-263737 | 9/2003 |
| WO | WO-98/36414 | 8/1998 |

* cited by examiner

Primary Examiner—Thang V Tran
(74) Attorney, Agent, or Firm—Dickstein Shapiro LLP

(57) ABSTRACT

A recording method recordings data on an information recording medium in units of blocks having a predetermine size, by judging whether or not a block of the data being recorded is a defective block, and newly recording the data in a block which follows the defective block and is in a vicinity of the defective block by skipping at least one block, if it is judged that the block being recorded is the defective block.

14 Claims, 12 Drawing Sheets

| BYTE POSITION | CONTENTS |
|---|---|
| 0-3 | ID("SLIP") |
| 4-5 | Number of Slipped ECC Blocks |
| 6-9 | 1st Slipped ECC Block No. |
| 10-13 | 2nd Slipped ECC Block No. |
| 14-17 | 3rd Slipped ECC Block No. |
| 18-21 | 4th Slipped ECC Block No. |
| ... | ... |
| ... | ... |
| 32764-32767 | ... |

RECORDING METHOD, INFORMATION RECORDING DEVICE, INFORMATION REPRODUCING DEVICE, PROGRAM, RECORDING MEDIUM, AND COMPUTER PROGRAM PRODUCT

TECHNICAL FIELD

The present invention generally relates to recording methods, information recording apparatuses, information reproducing apparatuses, programs and recording media, and more particularly to a recording method for recording data on an information recording medium, an information recording apparatus suited for carrying out such a recording method, an information reproducing apparatus capable of reproducing information from an information recording medium that is recorded by such a recording method, a program used by the information recording apparatus, and a recording medium recorded with such a program. In addition, the present invention also relates to a computer program product which has a program acquirable via media such as networks (LAN: Local Area Network, intranet, Internet, etc.) and the like.

BACKGROUND ART

There is much attention on optical discs such as a CD (Compact Disc) and a DVD (Digital Versatile Disc) as information recording media (media) for recording data, and optical disc apparatuses and DVD recorders have become popular as information recording apparatuses for recording the data on the optical discs.

Recordable CDs include CD-R, CD-RW and the like, and recordable DVDs include DVD-R, DVD+R, DVD-RW, DVD+RW, DVD-RAM and the like. The data recording and reproduction with respect to such CDs and DVDs are made according to predetermined standards.

Of such optical discs, the rewritable optical discs are applied with a defect management, as a means of securing reliability of the recorded data. According to this defect management, an alternate region is provided in advance on the optical disc, and when a defective portion is detected, a list correlating the defective portion and an alternate portion within the alternate region, to be used in place of the defective portion, is recorded on the optical disc. When making a recording or reproduction thereafter, a reference is made to the list so as to avoid the defective region (for example, refer to Patent Document 1).

However, because the alternate region is provided near an outer periphery of the disc, a seek operation to the alternate portion is generated if a defective portion exists within a reproducing region when reproducing the data from the disc. Particularly in a case where the data being reproduced is AV (Audio Visual) data, an inconvenience was generated in that the performance deteriorates due to the generation of the seek operation.

In addition, in a case where the defect management is not applied to the optical disc, the process interrupted when the error is generated while recording the data on the optical disc, and it becomes impossible to continue the recording. Particularly in a case of a write-once optical disc, the optical disc becomes unusable even if the defective portion is small.

Patent Document 1: Japanese Laid-Open Patent Application No. 2001-229622

DISCLOSURE OF THE INVENTION

Problems to be Solved by the Invention

A first object of the present invention is to provide a recording method and an information recording apparatus which can record information on an information recording medium with a high reliability without deteriorating the performance.

In addition, a second object of the present invention is to provide an information reproducing apparatus which can accurately reproduce, with a high performance, information from an information recording medium which has been recorded by the recording method of the present invention.

Furthermore, a third object of the present invention is to provide a program which is executed by a computer for controlling an information recording apparatus, and enables recording of information on an information recording medium with a high reliability without deteriorating the performance, and to provide a recording medium recorded with such a program.

Means of Solving the Problems

According to a first aspect of the present invention, a recording method for recording data on an information recording medium in units of blocks having a predetermine size, includes a judging step judging whether or not a block of the data being recorded is a defective block; and a newly recording step newly recording the data in a block which follows the defective block and is in a vicinity of the defective block by skipping at least one block, if the judging step judges that the block being recorded is the defective block.

According to the first aspect of the present invention, when recording the data on the information recording medium in units of blocks having the predetermine size, it is judged whether or not the block of the data being recorded is the defective block, and the data is newly recorded in the block which follows the defective block and is in the vicinity of the defective block by skipping at least one block, if it is judged that the block being recorded is the defective block. In this case, it is possible to continue the recording with respect to a recording error, even if no alternate region is provided on the information recording medium. In addition, it is possible to suppress a seek operation from being generated, because the data is newly recorded in the vicinity of the defective block. Accordingly, the information recording with respect to the information recording medium can be made with a high reliability, without deteriorating the performance.

According to a second aspect of the present invention, the recording method according to the first aspect of the present invention may further include an allocating step allocating a logical address to the block recorded with the data, without allocating a logical address to the defective block and the skipped block.

According to a third aspect of the present invention, the recording method according to the first or second aspect may further include a recording step recording, on the information recording medium, information related to the defective block and the skipped block, as slip information.

According to a fourth aspect of the present invention, the recording method according to the first aspect may further include a step recording dummy data in a block preceding the block that is to be newly recorded with the data, prior to carrying out the newly recording step, if the newly recording step is to newly record the data in the block which follows the defective block and is in the vicinity of the defective block by skipping at least two blocks.

According to a fifth aspect of the present invention, the recording method according to the fourth aspect may further include an allocating step allocating a logical address to the block recorded with the data, without allocating a logical address to the defective block, the skipped blocks and the block recorded with the dummy data.

According to a sixth aspect of the present invention, the recording method according to the fourth or fifth aspect may further include a recording step recording, on the information recording medium, information related to the defective block, the skipped blocks and the dummy data, as slip information.

According to a seventh aspect of the present invention, an information recording apparatus for recording data on an information recording medium in units of blocks having a predetermine size comprises recording means for recording the data on the information recording medium; judging means for judging whether or not a block of the data being recorded is a defective block; and control means for newly recording the data via the recording means in a block which follows the defective block and is in a vicinity of the defective block by skipping at least one block, if the judging means judges that the block being recorded is the defective block.

According to the seventh aspect of the present invention, when recording the data on the information recording medium in units of blocks having the predetermine size, it is judged whether or not the block of the data being recorded is the defective block, and the data is newly recorded in the block which follows the defective block and is in the vicinity of the defective block by skipping at least one block, if it is judged that the block being recorded is the defective block. In this case, it is possible to continue the recording with respect to a recording error, even if no alternate region is provided on the information recording medium. In addition, it is possible to suppress a seek operation from being generated, because the data is newly recorded in the vicinity of the defective block. Accordingly, the information recording with respect to the information recording medium can be made with a high reliability, without deteriorating the performance.

According to an eighth aspect of the present invention, the control means of the information recording apparatus according to the seventh aspect of the present invention may further record information related to the defective block and the skipped block on the information recording medium via the recording means.

According to a ninth aspect of the present invention, in the information recording apparatus according to the eighth aspect, the information recording medium may be an optical disc; and the information related to the defective block and the skipped block may be recorded in a lead-in zone of the optical disc.

According to a tenth aspect of the present invention, in the information recording apparatus according to any of the seventh through ninth aspects, no logical address may be allocated to the defective block and the skipped block.

According to an eleventh aspect of the present invention, the control means of the information recording apparatus according to the seventh aspect of the present invention may record dummy data in a block preceding the block that is to be newly recorded with the data, prior to newly recording the data, if the data is to be newly recorded in the block which follows the defective block and is in the vicinity of the defective block by skipping at least two blocks.

According to a twelfth aspect of the present invention, the control means of the information recording apparatus according to the seventh aspect of the present invention may further record on the information recording medium, via the recording means, information related to the defective block, the skipped blocks and the dummy data.

According to a thirteenth aspect of the present invention, in the information recording apparatus according to the eleventh aspect of the present invention, the information recording medium may be an optical disc; and the defective block, the skipped blocks and the block recorded with the dummy data may be recorded in a lead-in zone of the optical disc.

According to a fourteenth aspect of the present invention, in the information recording apparatus according to as claimed in any of the eleventh through thirteenth aspects of the present invention, no logical address may be allocated to the defective block, the skipped blocks and the block recorded with the dummy data.

According to a fifteenth aspect of the present invention, an information reproducing apparatus adapted to the information recording medium recorded by the recording method according to the third or sixth aspect of the present invention comprises acquiring means for acquiring the slip information from the information recording medium; and a processing apparatus for reproducing the data from the information recording medium by specifying a region recorded with the data which is a reproducing target, by referring to the acquired slip information.

According to the fifteenth aspect of the present invention, the information reproducing apparatus adapted to the information recording medium recorded by the recording method according to the third or sixth aspect of the present invention comprises the acquiring means for acquiring the slip information from the information recording medium; and the processing apparatus for reproducing the data from the information recording medium by specifying the region recorded with the data which is the reproducing target, by referring to the acquired slip information. Hence, it is possible to suppress a seek operation from being generated, and as a result, the information can accurately be reproduced from the information recording medium with a high performance.

According to a sixteenth aspect of the present invention, a program used in an information recording apparatus which records data on an information recording medium in units of blocks having a predetermined size causes a computer for controlling the information recording apparatus to execute a judging procedure to judge whether or not a block of the data being recorded is a defective block; and a newly recording procedure to newly record the data in a block which follows the defective block and is in a vicinity of the defective block by skipping at least one block, if the judging procedure judges that the block being recorded is the defective block.

According to the sixteenth aspect of the present invention, the program is loaded into a predetermined memory, and when a start address of this program is set in a program counter, the computer for controlling the information recording apparatus judges whether or not the block of the data being recorded is the defective block; and newly records the data in the block which follows the defective block and is in the vicinity of the defective block by skipping at least one block, if it is judged that the block being recorded is the defective block. In other words, the program can cause the computer for controlling the information recording apparatus to execute the recording method according to the first aspect of the present invention. Therefore, it is possible to record the information on the information recording medium with a high reliability, without deteriorating the performance.

According to a seventeenth aspect of the present invention, a computer-readable recording medium is recorded with the program according to the sixteenth aspect of the present invention.

According to the seventeenth aspect of the present invention, since the program according to the sixteenth aspect of the present invention is recorded therein, it is possible to cause the computer to execute the program, and record the information on the information recording medium with a high reliability, without deteriorating the performance.

According to an eighteenth aspect of the present invention, a computer program product comprises the program according to the sixteenth aspect of the present invention.

According to the eighteenth aspect of the present invention, since the program according to the sixteenth aspect of the present invention is recorded provided therein, it is possible to cause the computer to execute the program, and record the information on the information recording medium with a high reliability, without deteriorating the performance.

Effects of the Invention

According to the present invention, it is possible to realize a recording method and an information recording apparatus which can record information on an information recording medium with a high reliability without deteriorating the performance.

In addition, according to the present invention, it is possible to realize an information reproducing apparatus which can accurately reproduce, with a high performance, information from an information recording medium which has been recorded by the recording method of the present invention.

Furthermore, according to the present invention, it is possible to realize a program which is executed by a computer for controlling an information recording apparatus, and enables recording of information on an information recording medium with a high reliability without deteriorating the performance, and to realize a computer-readable recording medium recorded with such a program and a computer program product having such a program.

DESCRIPTION OF THE REFERENCE NUMERALS

15 Optical Disc (Information Recording Medium)
20 Optical Disc Apparatus (Information Recording Apparatus, Information Reproducing Apparatus)
23 Optical Pickup Unit (Portion of Recording Means)
24 Laser Control Circuit (Portion of Recording Means)
25 Encoder (Portion of Recording Means)
28 Reproduced Signal Processing Circuit (Portion of Acquiring Means, Portion of Processing Apparatus)
39 Flash Memory (Recording Medium)
40 CPU (Control Means, Judging Means, Portion of Acquiring Means, Portion of Processing Apparatus)

BEST MODE FOR CARRYING OUT THE INVENTION

Figure 1:
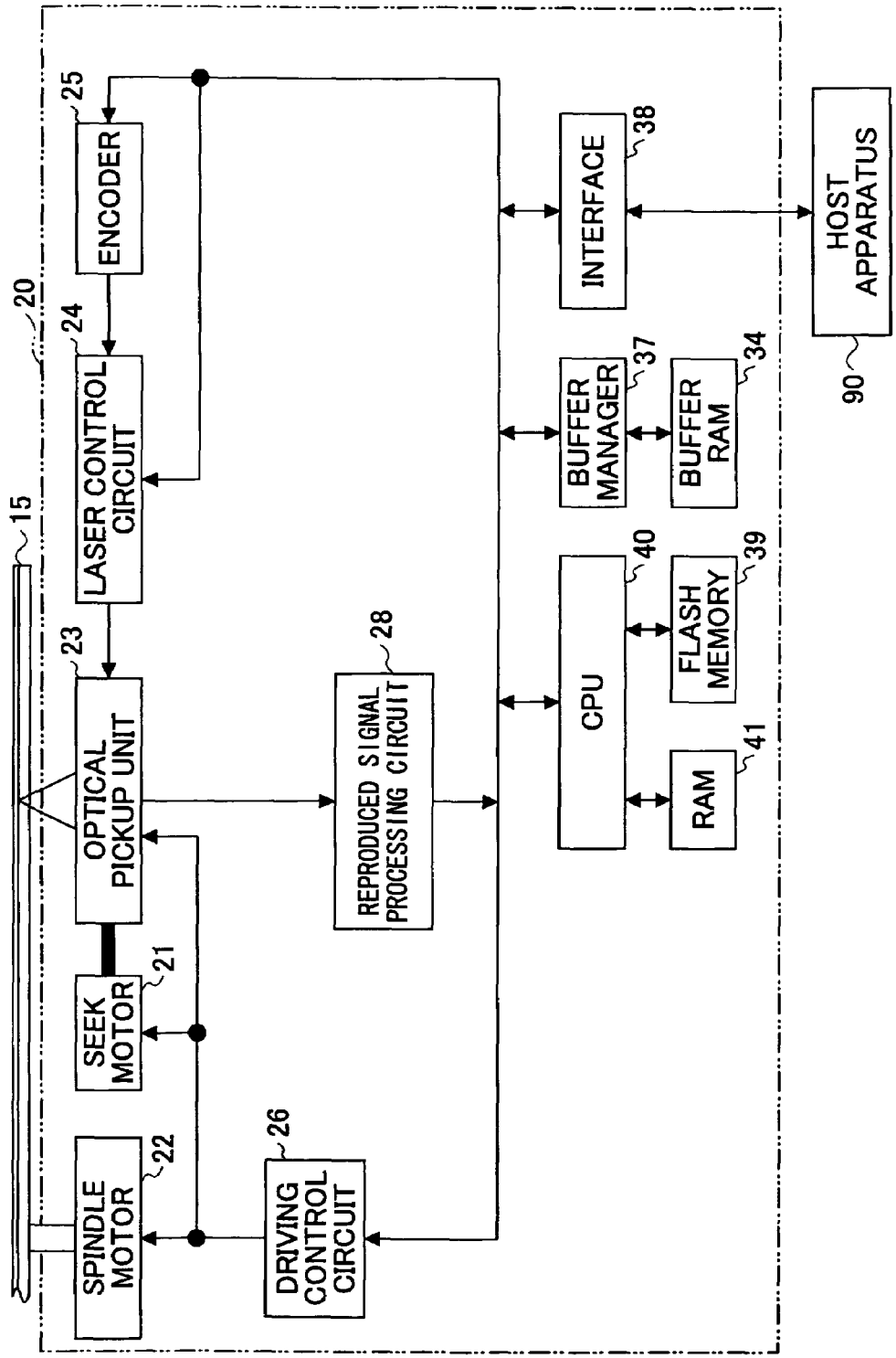
FIG. 1 is a block diagram showing a structure of an optical disc apparatus of an embodiment of the present invention.

A description will be given of an embodiment of the present invention, by referring to FIGS. 1 through 13. FIG. 1 shows a general structure of an optical disc apparatus 20, as an information recording apparatus and an information reproducing apparatus of this embodiment of the present invention.

Embodiments

The optical disc apparatus 20 shown in FIG. 1 has a spindle motor 22 for rotationally driving an optical disc 15, an optical pickup unit 23, a seek motor 21 for driving the optical pickup unit 23 in a sledge direction, a laser control circuit 24, an encoder 25, a driving control circuit 26, a reproduced signal processing circuit 28, a buffer RAM 34, a buffer manager 37, an interface 38, a flash memory 39, a CPU 40, a RAM 41 and the like. In FIG. 1, arrows indicate the flow of representative signals and information, and do not indicate all of the connection relationships of each of the blocks. In addition, in this embodiment, it is assumed for the sake of convenience that an information recording medium in conformance with the DVD standard is used as the optical disc 15. Furthermore, in this embodiment, it is assumed that the data recording is made in units of 1 ECC block (=16 sectors).

The optical pickup unit 23 irradiates laser light on a recording surface of the optical disc 15 having a spiral track or concentric tracks, and receives reflected light from the recording surface. The optical pickup unit 23 has an optical system, a light receiving unit, a driving system and the like. The optical system includes a semiconductor laser and an objective lens, and guides the beam emitted from the semiconductor laser to the recording surface of the optical disc 15, and also guides the return beam reflected from the recording surface to a predetermined light receiving position. The light receiving unit is arranged at the predetermined light receiving position, and receives the return beam. The driving system includes a focusing actuator and a tracking actuator (both not shown). The light receiving unit outputs to the reproduced signal processing circuit 28 a signal that is dependent upon an amount of received light.

The reproduced signal processing circuit 28 acquires servo signals (focus error signal, tracking error signal and the like), address information, a synchronizing signal, an RF signal and the like, based on the output signal of the light receiving unit forming the optical pickup unit 23. The acquired servo signals are output to the driving control circuit 26, the acquired address information is output to the CPU 40, and the acquired synchronizing signal is output to the encoder 25. A servo error and an address error during the recording are notified to the CPU 40, and are used to judge whether or not the recording is being carried out in a normal manner. Moreover, the reproduced signal processing circuit 28 carries out a decoding process, an error detection process and the like with respect to the RF signal. The reproduced signal processing circuit 28 carries out an error correction process when an error is detected, and thereafter stores the RF signal as reproduced data in the buffer RAM 34 via the buffer manager 37.

The driving control circuit 26 generates a driving signal for the tracking actuator to correct a positional error of the objective lens 60 in the tracking direction, based on the tracking error signal from the reproduced signal processing circuit 28, and generates a driving signal for the focusing actuator to correct a focus error of the objective lens 60 based on the focus error signal. Each of these driving signals is output to the optical pickup unit 23. Accordingly, the tracking control and the focus control are carried out. In addition, the driving control circuit 26 generates a driving signal for driving the seek motor 21 and a driving signal for driving the spindle motor 22, based on an instruction from the CPU 40. These driving signals are output to the seek motor 21 and the spindle motor 22, respectively.

The data (recording data) to be recorded on the optical disc 15, the data (reproduced data) reproduced from the optical disc 15 and the like are temporarily stored in the buffer RAM 34. The input and output of data to and from the buffer RAM 34 are managed by the buffer manager 37.

The encoder 25 obtains the recording data stored in the buffer RAM 34 via the buffer manager 37, based on an instruction from the CPU 40, and generates a write signal to the optical disc 15 by carrying out processes such as modulating the data and adding an error correction code. The generated write signal is output to the laser control circuit 24.

The laser control circuit 24 controls a power of the laser light emitted from the semiconductor laser forming the optical pickup unit 23. For example, at the time of the recording, the driving signal of the semiconductor laser is generated by the laser control circuit 24 based on the write signal, recording conditions, light emission characteristics of the semiconductor laser and the like.

The interface 38 is formed by a bidirectional communication interface with respect to a host apparatus 90 (for example, a personal computer), and is in conformance with a standard interface such as the ATAPI (AT Attachment Packet Interface), SCSI (Small Computer System Interface) and USB (Universal Serial Bus).

The flash memory 39 has a program region and a data region. Programs including a program according to the present invention, written in codes decodable by the CPU 40, are stored in the program region of the flash memory 39. The recording conditions, the light emission characteristics of the semiconductor laser and the like are stored in the data region of the flash memory 39.

The CPU 40 controls the operations of the various parts within the optical disc apparatus 20 according to the programs stored in the program region of the flash memory 39, and stores the data necessary for the controls and the like in the RAM 41 and the buffer RAM 34.

Figure 2:
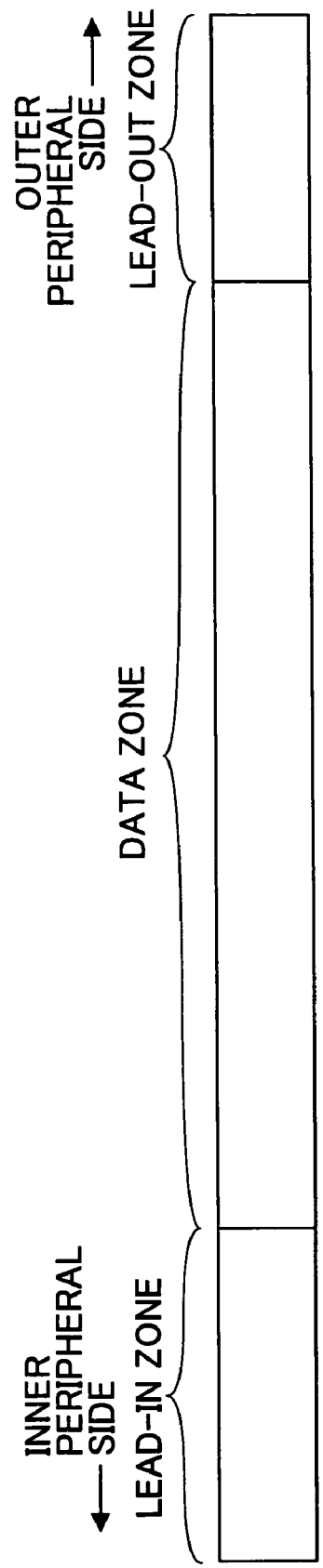
FIG. 2 is a diagram for explaining a layout of a recording region on an optical disc shown in FIG. 1.

Next, a description will be given of a main portion of a layout (disc layout) of the recording region of the optical disc 15. The spiral track is formed on the recording surface of the optical disc 15 as the recording region. As shown in FIG. 2, for example, this recording region is sectioned into a lead-in zone, a data zone and a lead-out zone, from the inner peripheral side towards the outer peripheral side of the optical disc 15. The user data from the host apparatus 90 is recorded in the data region.

Recording Process:

Next, a description will be given of a process that is carried out when the optical disc apparatus 20 having the structure described above receives a recording request command from the host apparatus 90, by referring to FIG. 3. A flow chart shown in FIG. 3 corresponds to a series of processing algorithms executed by the CPU 40.

Figure 3:
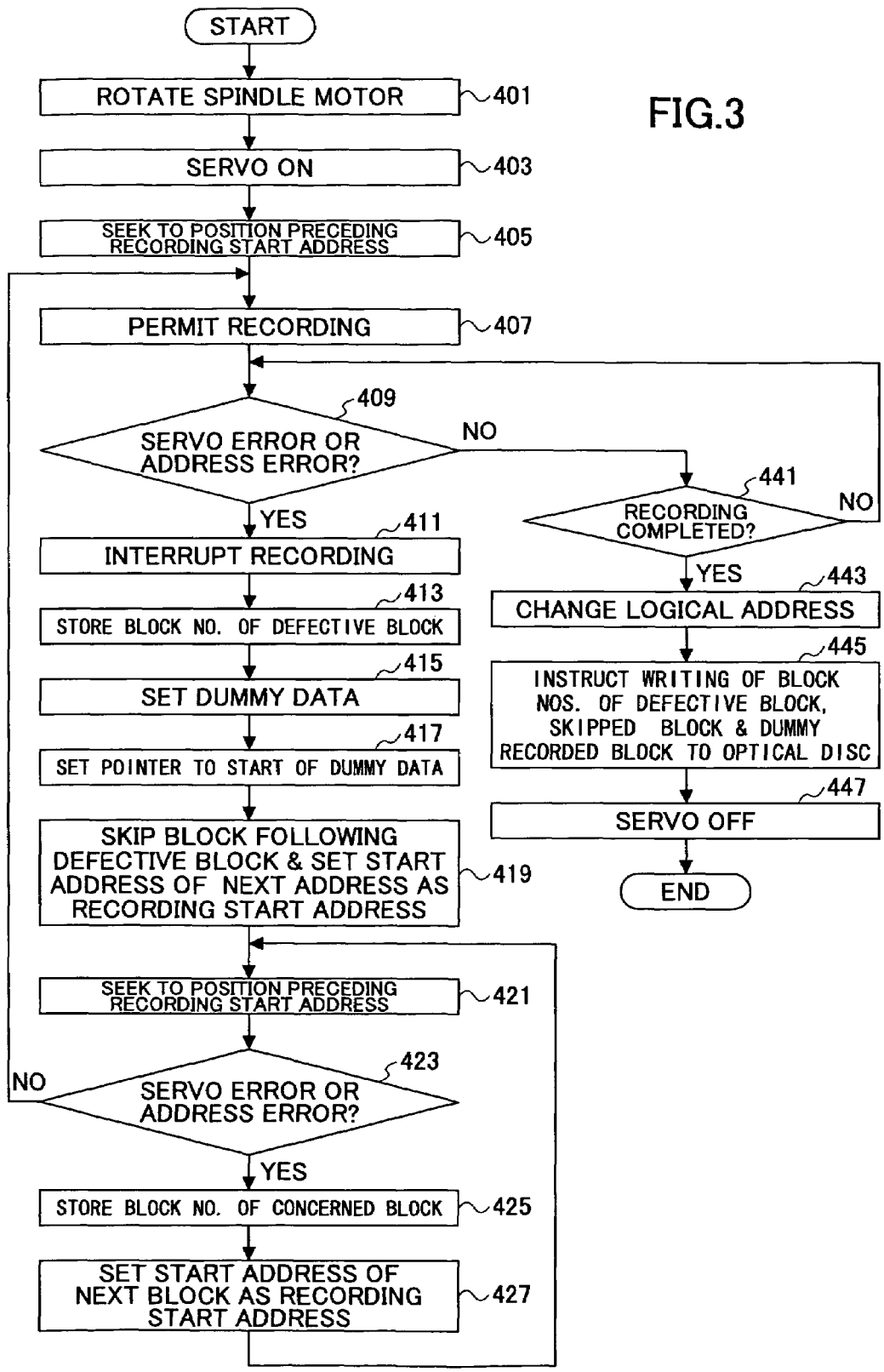
FIG. 3 is a flow chart for explaining a recording process.
Figure 4:
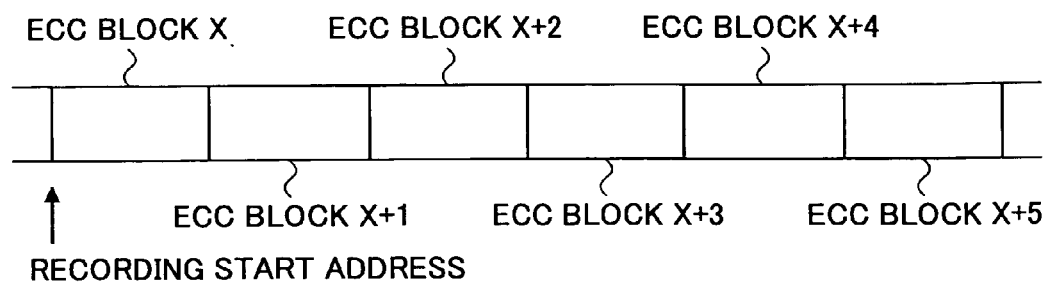
FIG. 4 is a diagram for explaining an ECC block to which data is recorded.

When the recording request command is received from the host apparatus 90, a start address of the program corresponding to the flow chart shown in FIG. 3 is set in a program counter of the CPU 40, and the recording process starts. It is assumed for the sake of convenience that, as shown in FIG. 4, a start address of an ECC block X is specified as the recording start address, and the size of the recording data is 4 ECC blocks.

In a first step 401, a signal for driving the spindle motor 22 based on the recording speed is output to the driving control circuit 26, and a notification is made to the reproduced signal processing circuit 28 to notify that the recording request command was received from the host apparatus 90. In addition, the storage of the user data (recording data) received from the host apparatus 90 into the buffer RAM 34 is instructed to the buffer manager 37.

In a next step 403, when it is confirmed that the rotation of the optical disc 15 has reached a predetermined speed, a servo ON setting is made with respect to the driving control circuit 26. Hence, the tracking control and the focus control are carried out as described above. The tracking control and the focus control are carried out at all times until the recording process ends.

In a next step 405, the recording start address is extracted from the recording request command, and an instruction is sent to the driving control circuit 26 so as to form a light spot at a position preceding the recording start address. Consequently, a seek operation is carried out. This process is skipped if the seek operation is unnecessary.

In a next step 407, the recording is permitted. Accordingly, the recording data is successively recorded on the optical disc 15 via the encoder 25, the laser control circuit 24 and the optical pickup unit 23.

In a next step 409, a judgement is made to determine whether a servo error or an address error exists.

In other words, a judgement is made to determine whether or not a block of the user data being recorded is a defective block. If the servo error or the address error exists, the decision result in the step 409 becomes YES, and the process advances to a step 411.

In the step 411, the interruption of the recording is instructed.

Figure 5:
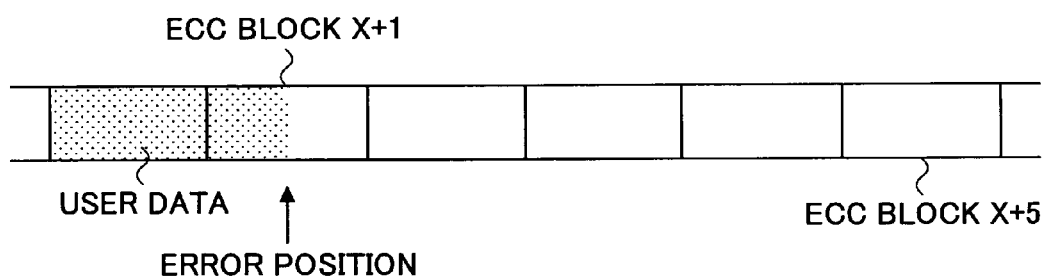
FIG. 5 is a diagram for explaining a recording error position.
Figure 6:
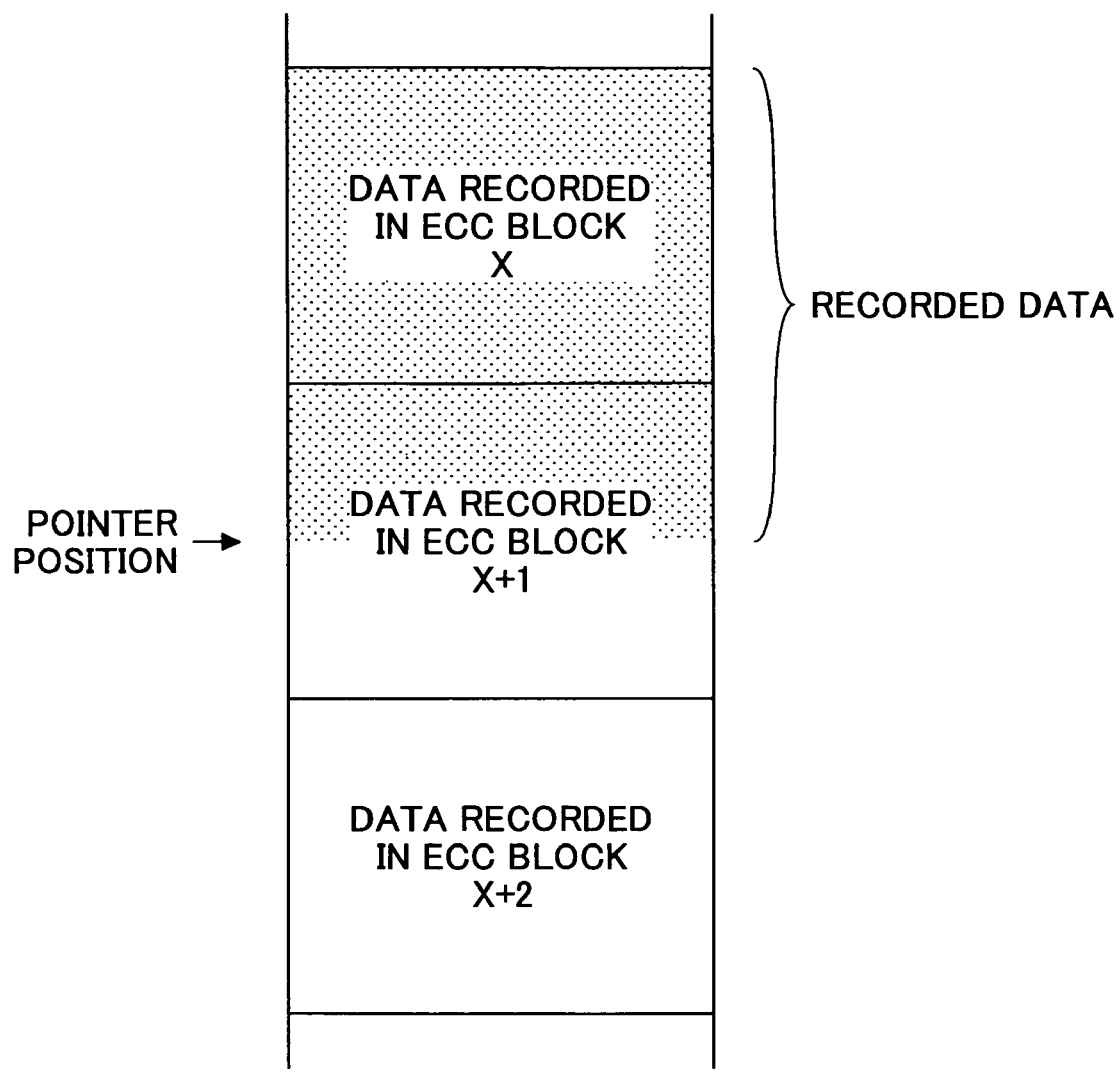
FIG. 6 is a diagram for explaining recording data and a pointer stored in a buffer RAM.

In a next step 413, the block number of the ECC block (that is, the defective block) in which the servo error or the address error occurred is stored in the RAM 41. As shown in FIG. 5, for example, it is assumed for the sake of convenience that the servo error or the address error is generated during the recording to the ECC block X+1. In addition, as shown in FIG. 6, for example, a pointer P indicating a start position of unrecorded data in the buffer RAM 34 indicates an intermediate portion of the recording data recorded in the ECC block X+1.

Figure 7A:
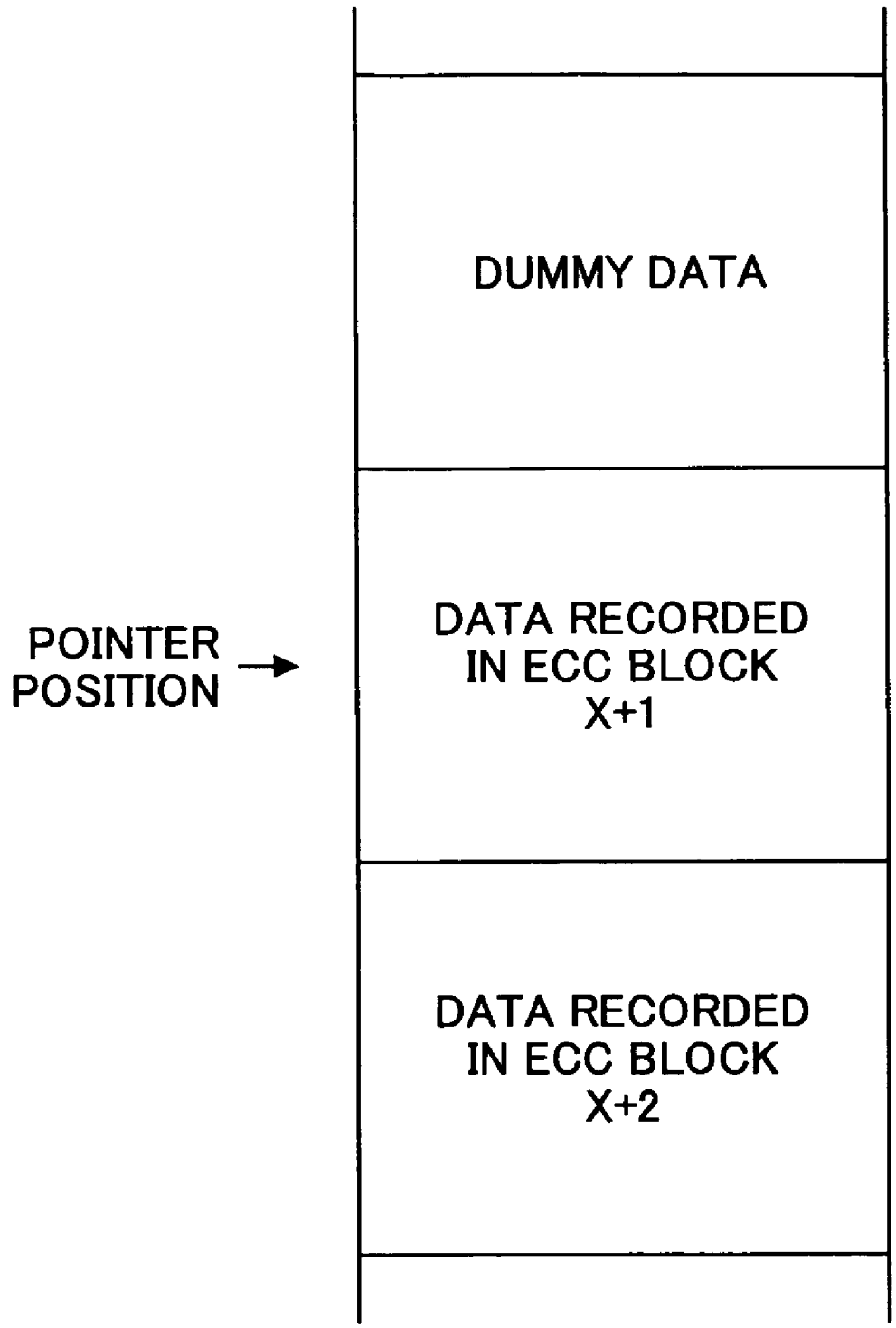
FIG. 7A is a diagram for explaining addition of dummy data.

In a next step 415, as shown in FIG. 7A, for example, the dummy data (for example, all "0"s) is recorded in a region of the buffer RAM 34 that stores the recording data recorded in the ECC block X. The dummy data has the role of the so-called run-in.

Figure 7B:
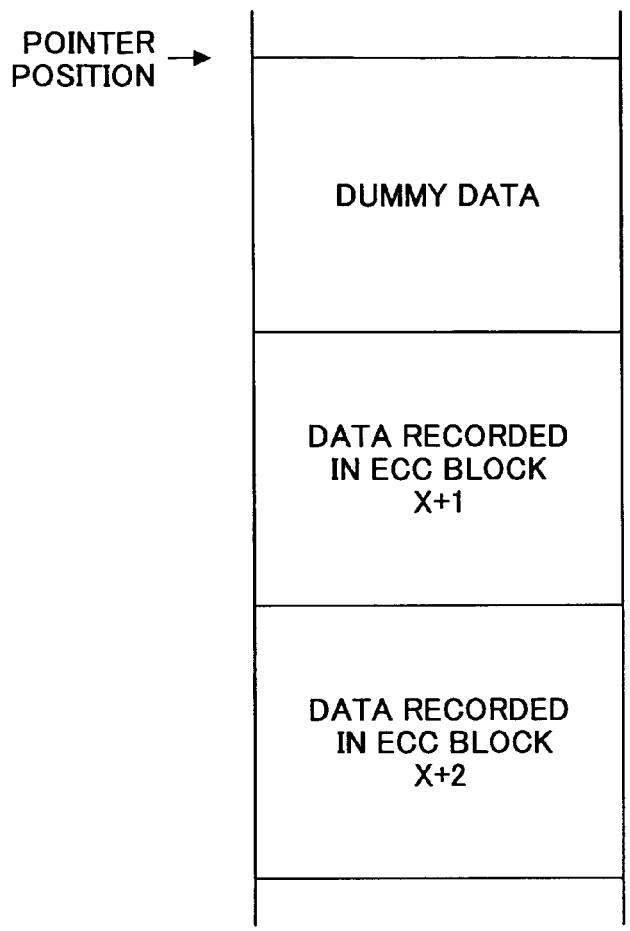
FIG. 7B is a diagram for explaining setting of a pointer position.

In a next step 417, as shown in FIG. 7B, for example, the pointer P is set at the start position of the dummy data.

Figure 8:
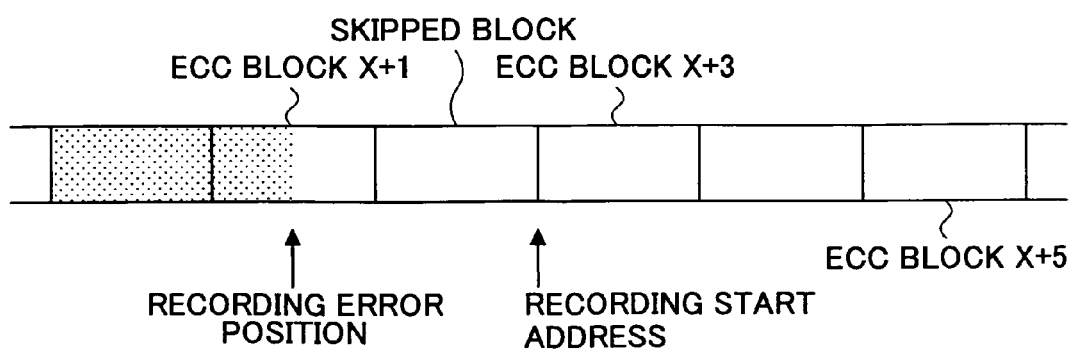
FIG. 8 is a diagram for explaining a new recording start address.
Figure 9:
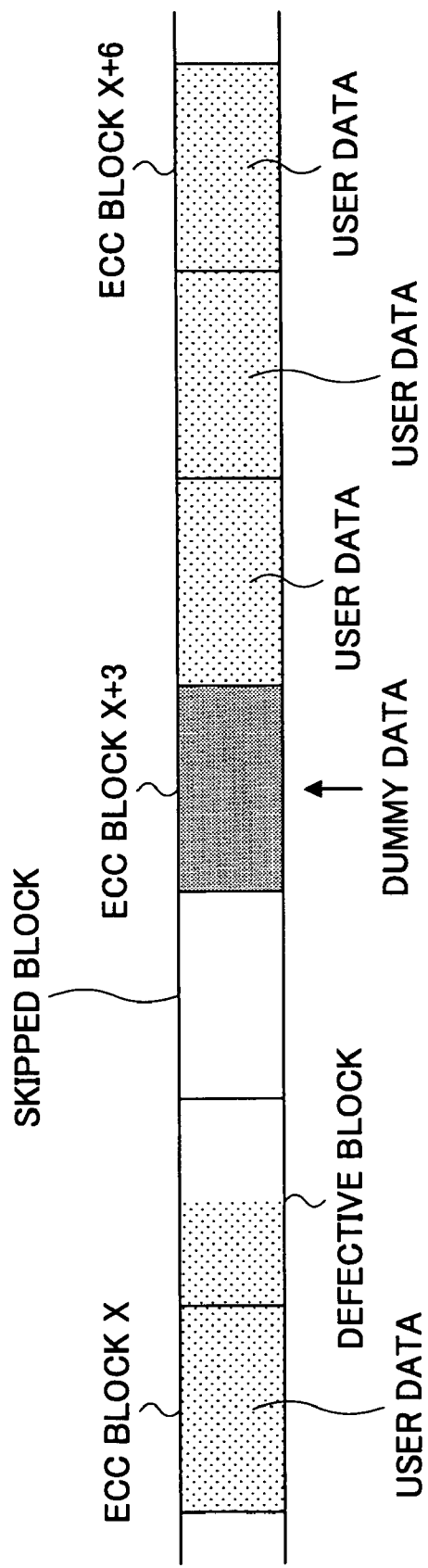
FIG. 9 is a diagram for explaining a data region at a time when the recording process ends.

In a next step 419, as shown in FIG. 8, for example, a block (ECC block X+2 in this particular case) following the defective block is skipped, and the start address of a next block (ECC block X+3 in this particular case) is set as the new recording start address.

In a next step 421, an instruction is sent to the driving control circuit 26 so as to form a light spot at a position preceding the recording start address. Consequently, a seek operation is carried out. This process is skipped if the seek operation is unnecessary.

In a next step 423, a judgement is made to determine whether a servo error or an address error exists. If no servo error and no address error exist, the decision result in the step 423 becomes NO, and the process returns to the step 407.

In the step 409, if no servo error and no address error exist, the decision result in the step 409 becomes NO, and the process advances to a step 441.

In the step 441, a judgement is made to determine whether or not all of the requested user data have been recorded. If unrecorded user data exists, the decision result in the step 441 becomes NO, and the process returns to the step 409. On the other hand, if all of the user data are recorded, the decision result in the step 441 becomes YES, and the process advances to a step 443. As shown inn FIG. 9, for example, the dummy data is recorded in the ECC block X+3, and the user data is recorded in the ECC block X and the ECC blocks X+4 through X+6.

In the next step 443, the logical address is changed. That is, measures are taken so that the logical address is not allocated to the defective block (ECC block X+1 in this particular case), the skipped ECC block (ECC block X+2 in this particular case), and the ECC block (ECC block X+3 in this particular case) recorded with the dummy data. Hence, if the logical sector address at the start of the ECC block X is 1000h, for example, the logical sector address at the start of the ECC block X+4 becomes 1010h, the logical sector address at the start of the ECC block X+5 becomes 1020h, and the logical sector address at the start of the ECC block X+6 becomes 1030h. In other words, the ECC block X and the ECC blocks X+4 through X+6 have continuous or sequential logical sector addresses.

Figures 10, 11:
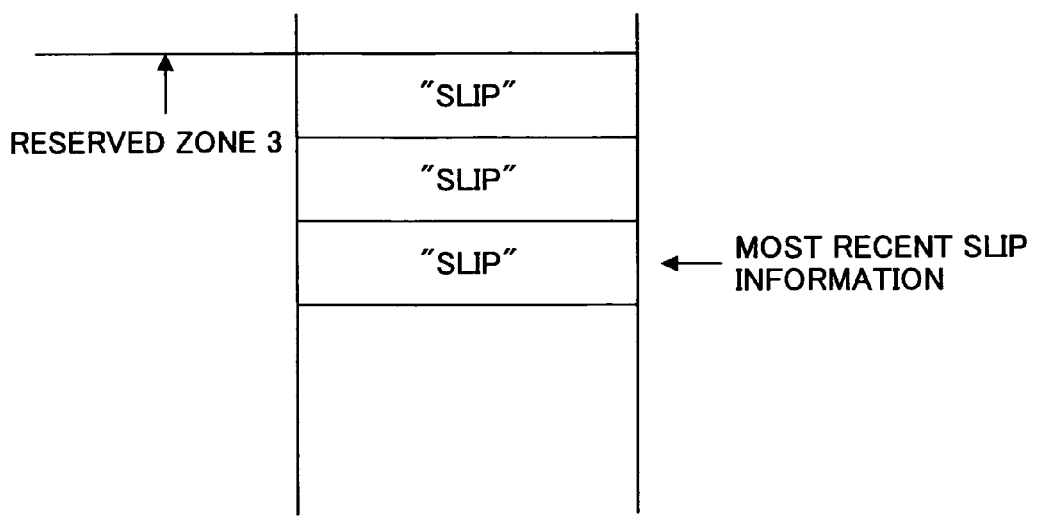
FIG. 10 is a diagram for explaining a data structure of slip information.
FIG. 11 is a diagram for explaining most recent slip information.

In a next step 445, the block numbers of the defective block, the skipped ECC block and the ECC block recorded with the dummy data are written on the optical disc 15. In the following description, if the defective block, the skipped ECC block and the ECC block recorded with the dummy data do not need to be distinguished from one another, these blocks will simply be referred to as "slipped blocks". In this particular case, slip information having a data structure with a size of 1 ECC block as shown in FIG. 10, for example, is written in a reserved zone 3 that is provided in the lead-in zone. This slip information is formed by an ID (ASCII data "SLIP") indicating that this information is the slip information, the number of slipped blocks, and the block number of each of the slipped blocks. For example, when a slipped block is newly generated, the new slit information is written in a region or zone following the previous slip information. Accordingly, as shown in FIG. 11, for example, the reserved zone 3 is reproduced, and the new slip information is stored in the ECC block last recorded with the ID "SLIP".

In a next step 447, a servo OFF setting is made with respect to the driving control circuit 26, and the recording process ends.

In the step 423 described above, if the servo error or the address error exists, the decision result in the step 423 becomes YES, and the process advances to a step 425.

In the step 425, the block number of the ECC block including the region indicated by the recording start address is stored in the RAM 41.

In a next step 427, the start address of the next ECC block is set as the new recording start address. After the step 427, the process returns to the step 421.

Thereafter, the processes and the judgements of the steps 421→423→425→427 are repeated until the decision result in the step 423 becomes NO. If no servo error and no address error exists in the step 423, the decision result in the step 423 becomes NO, and the process returns to the step 407.

Figure 12:
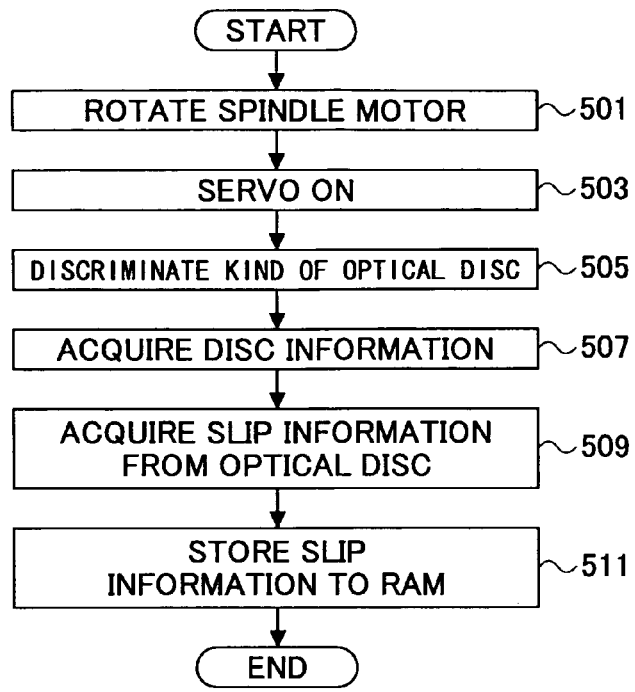
FIG. 12 is a flow chart for explaining a process at a time when an optical disc is loaded.

Next, a description will be given of the process and operation of the optical disc apparatus 20 when the optical disc 15 is removed from the optical disc apparatus 20 and reloaded (or mounted) to the optical disc apparatus 20, by referring to FIG. 12. A flow chart shown in FIG. 12 corresponds to a series of processing algorithms executed by the CPU 40.

In a first step 501, a signal for driving the spindle motor 22 based on a predetermined reproducing speed is output to the driving control circuit 26.

In a next step 503, when it is confirmed that the rotation of the optical disc 15 has reached a predetermined speed, the servo ON setting is made with respect to the driving control circuit 26. Hence, the tracking control and the focus control are carried out as described above.

In a next step 505, the kind of optical disc 15 is discriminated. For example, whether the optical disc 15 is a DVD+R or a DVD+RW may be discriminated from the reflectance of the recording surface.

In a next step 507, disc information recorded on the optical disc 15 is acquired. For example, in the case of the DVD+R or the DVD+RW, wobble shapes are recorded by phase modulation.

In a next step 509, the most recent slip information is acquired from the reserved zone 3.

In a next step 511, the slip information is stored in the RAM 41, and the process ends.

Reproducing Process:

Next, a description will be given of a process that is carried out when the optical disc apparatus 20 having the structure described above receives a reproduction request command from the host apparatus 90, by referring to FIG. 13. A flow chart shown in FIG. 13 corresponds to a series of processing algorithms executed by the CPU 40.

Figure 13:
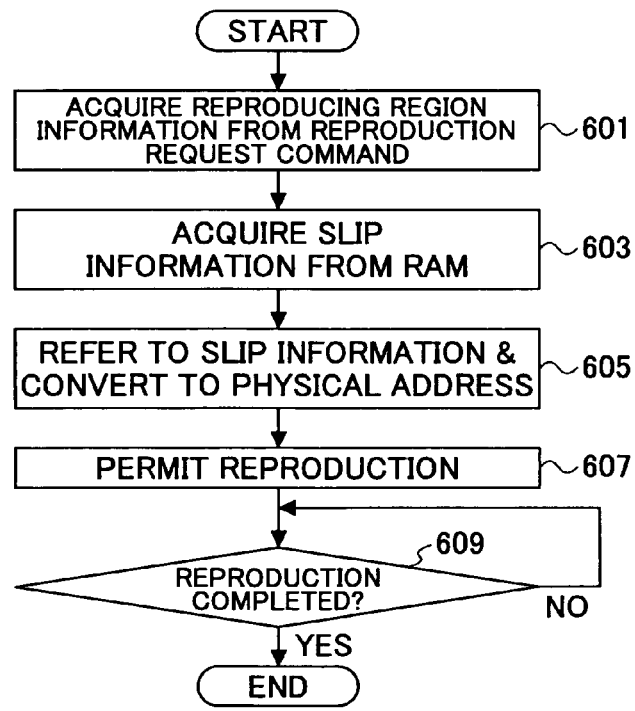
FIG. 13 is a flow chart for explaining a reproducing process.

When the reproduction request command is received from the host apparatus 90, a start address of the program corresponding to the flow chart shown in FIG. 13 is set in the program counter of the CPU 40, and the reproducing process starts. It is assumed for the sake of convenience that the optical disc 15 is already rotating at the reproducing speed.

In a first step 601, the information (reproduction start address and reproducing data length) related to the reproducing region is acquired from the reproduction request command. The reproduction start address is a logical sector address.

In a next step 603, the slip information is acquired from the RAM 41.

In a next step 605, the logical sector address is converted into a physical sector address using the following formula (1). It is assumed for the sake of convenience that the start address of the data region has the physical sector address 30000h and the logical sector address 0h. In addition, N denotes the number of slipped blocks preceding the logical sector address. 1 ECC block is made up of 16 (10h) sectors.

$$(\text{Physical Sector Address}) = (\text{Logical Sector Address}) - 30000h + 10h \times N \quad (1)$$

In a next step 607, the reproduction is permitted.

In a next step 609, a judgement is made to determine whether or not the reproduction has ended. If the reproduction has not ended, the decision result in the step 609 becomes NO, and after a predetermined wait time, a judgement is made again to determine whether or not the reproduction has ended. On the other hand, if the reproduction has ended, the decision result in the step 609 becomes YES, and the process ends.

As may be understood from the description given heretofore, in the optical disc apparatus 20 according to this embodiment, a recording means is formed by the encoder 25, the laser control circuit 24 and the optical pickup unit 23. In addition, a judging means and a control means are realized by the CPU 40 and the programs executed by the CPU 40. In other words, the judging means is realized by the process of the step 409 shown in FIG. 3, and the control means is realized by the processes of the steps 411 through 427, 441 and 443 shown in FIG. 3. Moreover, an acquiring means and a processing apparatus are realized by the reproduced signal processing circuit 28, the CPU 40 and the programs executed by the CPU 40. In other words, a portion of the acquiring means is realized by the processes of the steps 509 and 511 shown in FIG. 12, and a portion of the processing apparatus is realized by the processes of the steps 605 through 609 shown in FIG. 13. Of course, at least a portion of each of the means realized by the processes according to the programs executed by the CPU 40 or, all of the means realized by the processes according to the programs executed by the CPU 40, may be formed by hardware.

In this embodiment, of the programs stored in the flash memory 39, the program according to the present invention is executed in the program corresponding to the flow chart shown in FIG. 3. In other words, a judging procedure is executed by the program corresponding to the process of the step 409 shown in FIG. 3, and a newly recording procedure is executed by the program corresponding to the processes of the steps 419 through 427 and 407 shown in FIG. 3. In addition, a dummy data recording procedure is executed by the program corresponding to the processes of the steps 415, 417 and 407 shown in FIG. 3.

In addition, the recording method according to the present invention is carried out by the process shown in FIG. 3. That is, a judging step is carried out by the process of the step 409 shown in FIG. 3, and a newly recording step is carried out by the processes of the steps 419 through 427 and 407 shown in FIG. 3. Moreover, an allocating step is carried out by the process of the step 441 shown in FIG. 3, and a slip information recording step is carried out by the process of the step 443 shown in FIG. 3. Furthermore, a dummy data recording step is carried out by the processes of the steps 415, 416 and 407 shown in FIG. 3.

As described heretofore, according to the optical disc apparatus 20 of this embodiment, a judgement is made to determine whether or not the block of the user data being recorded is a defective block, when recording the user data on the optical disc 15 (information recording medium) in units of 1 ECC block. If it is found as a result of this judgment that the block being recorded is a defective block, the user data are newly recorded in the block following the defective block by skipping at least 1 block. In this case, it is possible to continue the recording even if no alternate region is provided on the optical disc 15. In addition, since the user data are newly recorded in a vicinity of the defective block, it is possible to suppress a seek operation from being generated. Therefore, it is possible to carry out an information recording with respect to the information recording medium with a high reliability, without deteriorating the performance.

In addition, according to this embodiment, if the block recorded with the user data is a defective block, the run-in (dummy data) is recorded in the block following the run-in by skipping at least 1 block, and the user data is recorded in the block following the run-in. Hence, it is possible to positively recognize the recording position of the user data.

Moreover, according to this embodiment, no logical address is allocated to the defective block, the skipped block and the block recorded with the run-in. For this reason, it is possible to match the logical sector address of the entity in the management information that manages the files and chapter information, and the logical sector address of the actual entity. The chapter information is recorded in a filed called VIDEO_TS in the case where the optical disc 15 is in conformance with the DVD-Video standard, and includes the chapter numbers existing on the optical disc 15 and the start addresses of the chapters.

Furthermore, according to this embodiment, the information related to the defective block, the skipped block and the block recorded with the run-in is recorded as the slip information in the reserved zone 3 of the lead-in zone of the optical disc 15. For this reason, even if the optical disc 15 is removed from the optical disc apparatus 20 and reloaded (or mounted) to the optical disc apparatus 20, it is possible to know the slip information of the optical disc 15. Of course, the region recorded with the slip information is not limited to the reserved zone 3, and may be any reserved zone or region that is presently unused, for example.

According to this embodiment, the slip information is read from the optical disc 15 and stored in the RAM 41 when the optical disc 15 is loaded (or mounted) to the optical disc apparatus 20. Hence, it is possible to immediately accept an access request from the host apparatus 90. Further, even if a slipped block exists at a position preceding the logical sector address, it is possible to correctly convert the logical sector address into the physical sector address.

Figure 14:
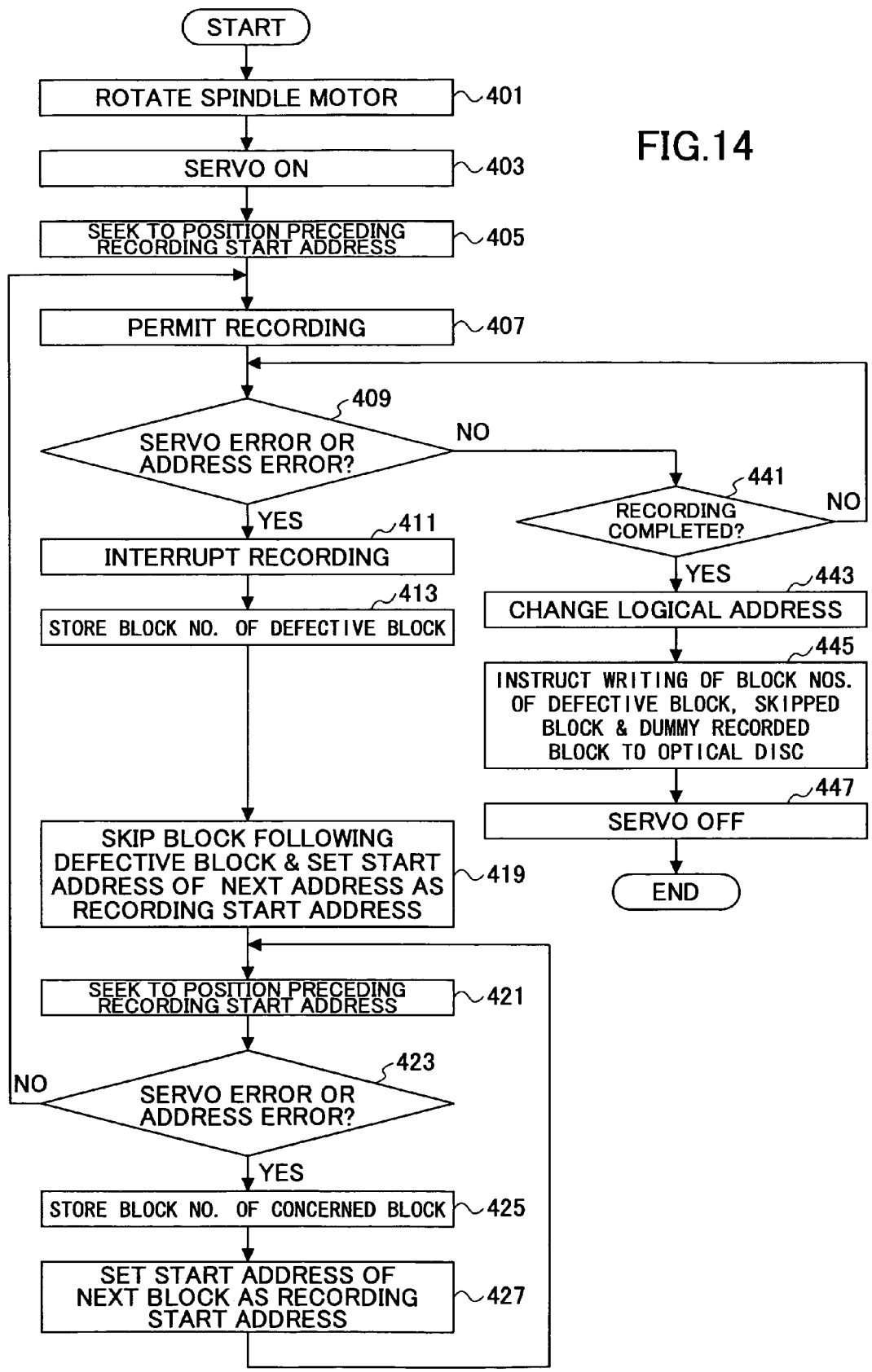
FIG. 14 is a flow chart for explaining a modification of the recording process.
Figure 15:
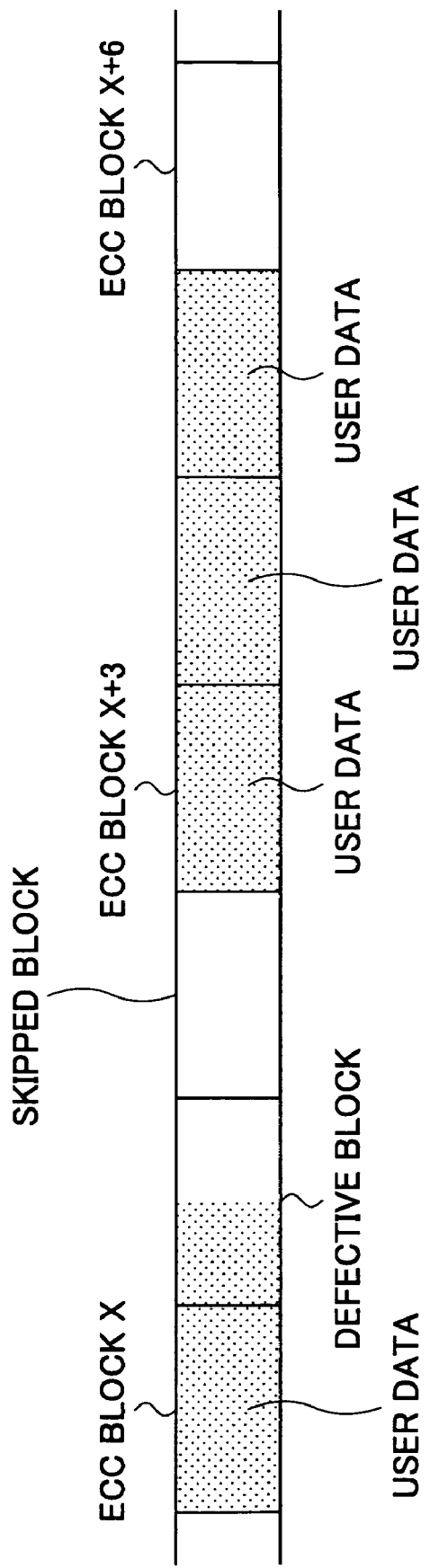
FIG. 15 is a diagram for explaining the data region at a time when the recording process shown in FIG. 14 ends.

In the embodiment described above, the run-in block is added before the block that newly records the user data, but the present invention is of course not limited to such. For example, as shown in a flow chart of FIG. 14, the processes of the steps 415 and 417 of the above described embodiment may be omitted. In this case, as shown in FIG. 15, for example, no run-in block exists, and the user data is recorded in the ECC block X and the ECC blocks X+3 through X+5.

It is assumed in the above described embodiment that the optical disc is a DVD, but the present invention is not limited to such, and the present invention is of course applicable to CDs or next-generation information recording media that cope with light having a wavelength of approximately 405 nm. In this case, the optical disc apparatus used has a structure adapted to the kind of information recording medium used.

In the embodiment described above, the program according to the present invention is recorded in the flash memory 39, but the program may be recorded in other computer-readable recording media (CD, magneto-optical disc, DVD, memory card, USB memory, flexible disc, etc.). In this case, the program according to the present invention is loaded into the flash memory 39 via a reproducing apparatus (or an exclusive or dedicated interface) that is adapted to each recording medium. In addition, it is also possible to transfer the program according to the present invention to the flash memory 39 via a medium such as a network (LAN, intranet, Internet, etc.), and the computer program product according to the present invention may comprise a program that is acquirable via such a medium. In other words, all that is required is for the program according to the present invention to be stored in the flash memory 39.

In the embodiment described above, the optical pickup unit is provided with a semiconductor laser, but the present invention is not limited to such. For example, the optical pickup unit may be provided with a plurality of semiconductor lasers that emit beams having mutually different wavelengths. In this case, the optical pickup unit may include at least one semiconductor laser selected from a semiconductor laser that emits a beam having a wavelength of approximately 405 nm, a semiconductor laser that emits a beam having a wavelength of approximately 660 nm and a semiconductor laser that emits a beam having a wavelength of approximately 780 nm. In other words, the optical disc apparatus may be adapted to a plurality of kinds of optical discs in conformance with mutually different standards.

INDUSTRIAL APPLICABILITY

The present invention is applicable to various information recording apparatuses and/or information reproducing apparatuses that use a recording medium such as an optical disc.

Further, the present invention is not limited to these embodiments, but various variations and modifications may be made without departing from the scope of the present invention.

The invention claimed is:

1. A recording method for recording data on an information recording medium in units of blocks having a predetermined size, comprising:
   a judging step judging whether or not a block of the data being recorded is a defective block;
   a newly recording step newly recording the data in a block which follows the defective block and is in a vicinity of the defective block by skipping at least one block, if the judging step judges that the block being recorded is the defective block; and
   a step recording dummy data in a block preceding the block that is to be newly recorded with the data, prior to carrying out the newly recording step, if the newly recording step is to newly record the data in the block which follows the defective block and is in the vicinity of the defective block by skipping at least two blocks.

2. The recording method as claimed in claim 1, further comprising:
   an allocating step allocating a logical address to the block recorded with the data, without allocating a logical address to the defective block and the skipped block.

3. The recording method as claimed in claim 1 or 2, further comprising:
   a recording step recording, on the information recording medium, information related to the defective block and the skipped block, as slip information.

4. The recording method as claimed in claim 1, further comprising:
   an allocating step allocating a logical address to the block recorded with the data, without allocating a logical address to the defective block, the skipped blocks and the block recorded with the dummy data.

5. The recording method as claimed in claim 4, further comprising:
   a recording step recording, on the information recording medium, information related to the defective block, the skipped blocks and the dummy data, as slip information.

6. An information recording apparatus for recording data on an information recording medium in units of blocks having a predetermined size, comprising:
   a recording unit configured to record the data on the information recording medium;
   a judging unit configured to judge whether or not a block of the data being recorded is a defective block; and
   a control unit configured to newly record the data via the recording means in a block which follows the defective block and is in a vicinity of the defective block by skipping at least one block, if the judging unit judges that the block being recorded is the defective block,
   wherein the control unit records dummy data in a block preceding the block that is to be newly recorded with the data, prior to newly recording the data, if the data is to be newly recorded in the block which follows the defective block and is in the vicinity of the defective block by skipping at least two blocks.

7. The information recording apparatus as claimed in claim 6, wherein the control unit further records information related to the defective block and the skipped block on the information recording medium via the recording unit.

8. The information recording apparatus as claimed in claim 7, wherein:
   the information recording medium is an optical disc; and
   the information related to the defective block and the skipped block is recorded in a lead-in zone of the optical disc.

9. The information recording apparatus as claimed in any of claims 6 to 8, wherein no logical address is allocated to the defective block and the skipped block.

10. The information recording apparatus as claimed in claim 6, wherein the control unit further records on the information recording medium, via the recording unit, information related to the defective block, the skipped blocks and the dummy data.

11. The information recording apparatus as claimed in claim 6, wherein:
   the information recording medium is an optical disc; and
   the defective block, the skipped blocks and the block recorded with the dummy data are recorded in a lead-in zone of the optical disc.

12. The information recording apparatus as claimed in any of claims 10 to 11, wherein no logical address is allocated to the defective block, the skipped blocks and the block recorded with the dummy data.

13. A computer-readable recording medium on which a computer-readable program which, when executed by a computer, causes the computer to record data on an information recording medium in units of blocks having a predetermined size, is stored, said program causing the computer to perform a process comprising:
   a judging procedure causing the computer to judge whether or not a block of the data being recorded is a defective block;
   a newly recording procedure causing the computer to newly record the data in a block which follows the defective block and is in a vicinity of the defective block by skipping at least one block, if the judging procedure judges that the block being recorded is the defective block; and a procedure causing the computer to record dummy data in a block preceding the block that is to be newly recorded with the data, prior to carrying out the newly recording procedure, if the newly recording procedure is to newly record the data in the block which follows the defective block and is in the vicinity of the defective block by skipping at least two blocks.

14. A recording method for recording data on an information recording medium in units of blocks having a predetermined size, comprising:

judging whether or not a block of the data being recorded is a defective block;

newly recording the data in a block which follows the defective block and is in a vicinity of the defective block by skipping at least one block, if said judging judges that the block being recorded is the defective block; and allocating a logical address to the block recorded with the data, without allocating a logical address to the defective block and the skipped block.

* * * * *